Dec. 1, 1942.   W. H. MITCHELL ET AL   2,303,856
MATERIAL DISCHARGE DEVICE FOR AIRPLANES
Filed Aug. 6, 1940
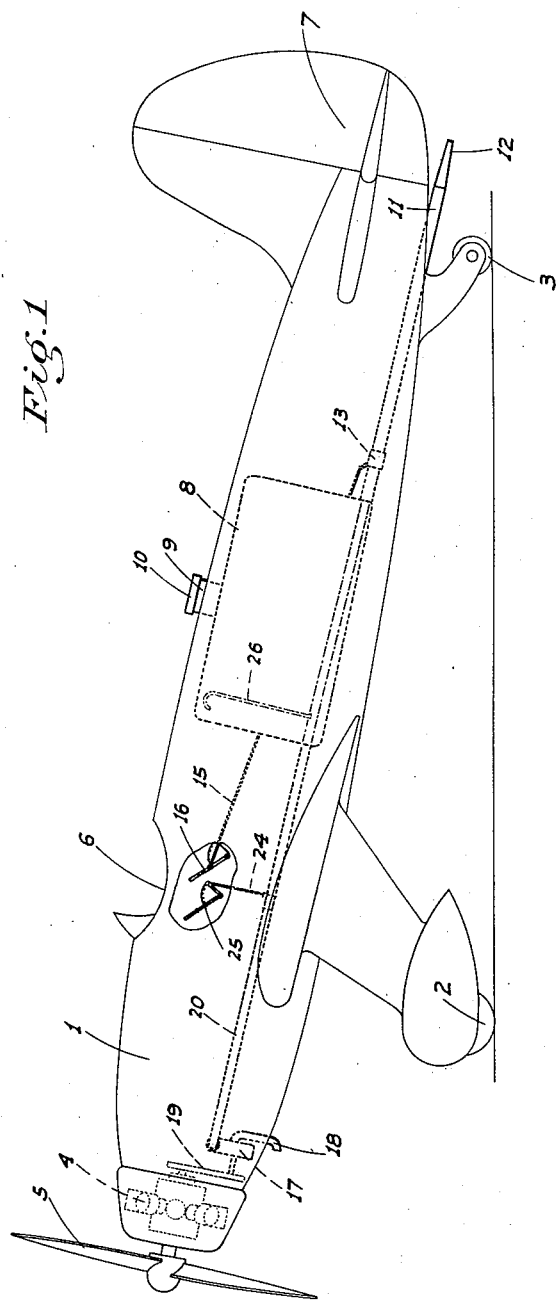
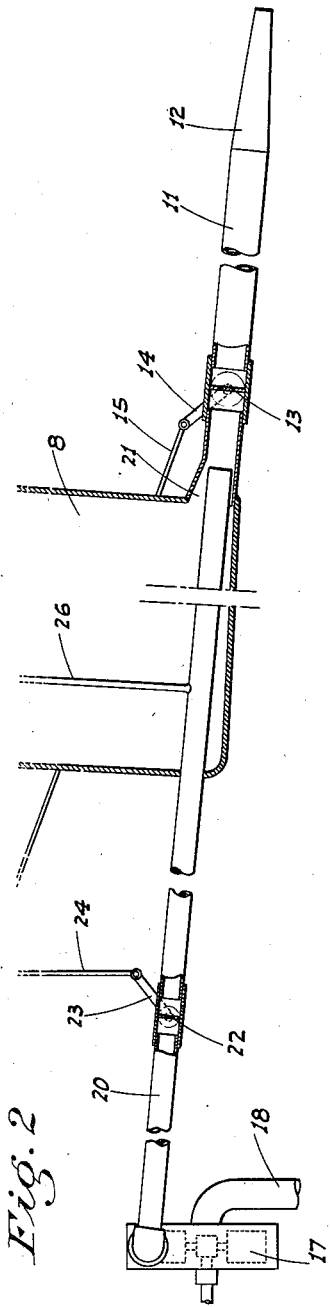
INVENTORS
Wm. H. Mitchell
A. M. Jorgensen
BY
Corbter Corbter
ATTORNEYS Patented Dec. 1, 1942

2,303,856

UNITED STATES PATENT OFFICE 2,303,856

MATERIAL DISCHARGE DEVICE FOR AIRPLANES

William H. Mitchell and Anton M. Jorgensen, Petaluma, Calif.

Application August 6, 1940, Serial No. 351,604

2 Claims. (Cl. 244—136)

This invention relates in general to aircraft and in particular the invention is directed to, and it is our principal object to provide, in combination with an airplane, material discharging apparatus of unique design; such apparatus being suited both for military and domestic use.

Among the uses to which the apparatus may be put are crop dusting and spraying; distribution of seeds and fertilizer; control of insects, as for example the spraying of required chemicals on swampy areas to control mosquitoes; and forest and grass fire control by distribution of suitable chemicals in the area of the fire.

It will be recognized that there are many other practical uses for the invention.

An additional object of the invention is to provide novel means to effect and control the discharge of the material from the container carried by the airplane.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawing similar characters of reference indicate corresponding parts in the several views:

Figure 1 is a diagrammatic elevation of an airplane embodying the invention.

Figure 2 is an enlarged foreshortened, sectional elevation illustrating the material discharging apparatus separate from the airplane.

Referring now more particularly to the characters of reference on the drawing, the material discharging apparatus is, in the present instance, shown in connection with a low wing monoplane type airplane which includes a fuselage 1, forward landing wheels 2, tail wheel 3, engine 4, propeller 5, pilot's cockpit 6, and tail assembly 7, all as is conventional.

The material discharging apparatus comprises a relatively large capacity reservoir or tank 8 suitably mounted within the fuselage rearwardly of the cockpit 6, such tank including an upwardly projecting filling neck 9 having a removable cover 10 secured thereon exteriorly of the fuselage.

A discharge pipe 11 extends from the rearward and lower edge of tank 8 at a rearward and downward slope, such pipe projecting out of the fuselage behind the tail wheel 3 and below the tail assembly 7. At its outer end pipe 11 is formed with a discharge nozzle 12 whose discharge opening is substantially restricted relative to the internal diameter of pipe 11. A flow control valve 13 is interposed in pipe 11 between tank 8 and nozzle 12, such valve including an actuating lever 14 connected by a control rod 15 which extends forwardly to a control lever unit 16 mounted in the cockpit 6.

In order to assure the forceful discharge of material from tank 8 through pipe 11 and out of nozzle 12 during flight of the airplane, we provide the following mechanism:

A centrifugal blower 17 is suitably mounted in the fuselage adjacent but rearwardly of engine 4, such blower having an air intake horn 18 and being driven from engine 5 by any suitable means such as a pulley and belt assembly indicated at 19. A pipe 20 leads from the discharge side of the centrifugal blower 17 rearwardly through the tank; the discharge end of pipe 20 projecting a short distance into the adjacent end of pipe 11. As the external diameter of said end of pipe 20 is of less diameter than the internal diameter of the adjacent portion of pipe 11, and which portion of pipe 11 is also enlarged somewhat as at 21, such assembly forms in effect an ejector, the blast of air passing from pipe 20 into pipe 11 causing a suction in pipe 11 drawing material from tank 8. The blast of air through pipe 20 is controlled by means of a valve 22 including an actuating lever 23 operating by means of a rod 24 which leads to another control lever unit 25 in cockpit 6. In order to maintain the material in the tank under pressure and to further assure its free flow into pipe 11 for discharge, a small diameter stand pipe 26 is mounted on and in communication with pipe 20 adjacent the forward end of tank 8, pipe 26 extending upward to a termination adjacent the top of the tank.

It should also be noted that the bottom of the elongated tank 8 and the bottom of discharge pipe 11 are disposed in substantially the same plane, and that both such bottom of the tank and discharge pipe extend at a substantial rearward and downward slope relative to a normal and horizontal line of flight. By virtue of this arrangement discharge of material from the tank and through the pipe is subject to a gravitational displacement, and this further assures proper discharge of material from the tank and through the pipe.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. Material discharging apparatus for an airplane which includes a fuselage and an engine mounted on the forward end thereof; said material discharging apparatus comprising a pipe assembly extending within and lengthwise of the fuselage from a point adjacent but rearwardly of the engine to a point adjacent the rear portion of the fuselage and thence projecting through the latter, a material tank mounted in the fuselage and arranged to feed material into said pipe assembly intermediate its ends, an air blower connected with the forward end of said pipe assembly, and means to drive the blower from the engine, said blower and drive means being disposed wholly within the fuselage.

2. Material discharging apparatus for an airplane which includes a fuselage; said apparatus comprising an elongated material tank mounted in the fuselage lengthwise thereof, a longitudinally extending discharge pipe leading rearwardly from one end of the tank to a point exteriorly of the fuselage, the bottom of the tank and bottom of the pipe being disposed in substantially the same plane, and both extending at a substantial rearward and downward slope relative to a normal horizontal line of flight, an air blast pipe of lesser diameter than said discharge pipe extending into said tank and projecting as an injector into the adjacent end of said discharge pipe, and a relatively small capacity vent pipe leading from the air blast pipe to a point in the tank adjacent the top at the forward end thereof.

WILLIAM H. MITCHELL.
ANTON M. JORGENSEN.